(12) United States Patent
Li (10) Patent No.: US 7,013,359 B1
(45) Date of Patent: Mar. 14, 2006

(54) HIGH SPEED MEMORY INTERFACE SYSTEM AND METHOD

(75) Inventor: Gabriel Li, San Francisco, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 367 days.

(21) Appl. No.: 10/032,248

(22) Filed: Dec. 21, 2001

(51) Int. Cl.
*G06F 13/14* (2006.01)

(52) U.S. Cl. ............... 710/305; 710/308; 710/310

(58) Field of Classification Search ............ 710/52, 710/305, 308, 310, 313; 711/5, 105; 713/320, 713/323; 365/233, 230.03, 51, 52, 230.08; 327/144, 150
See application file for complete search history.

(56) References Cited

U.S. PATENT DOCUMENTS

| | | | |
|---|---|---|---|
| 4,513,374 A * | 4/1985 | Hooks, Jr. ............ 365/230.04 |
| 6,215,727 B1 * | 4/2001 | Parson et al. ............... 365/233 |
| 6,373,302 B1 * | 4/2002 | Li et al. ..................... 327/144 |
| 6,378,018 B1 * | 4/2002 | Tsern et al. ................. 710/313 |
| 6,449,213 B1 * | 9/2002 | Dodd et al. ................. 365/233 |
| 6,493,250 B1 * | 12/2002 | Halbert et al. ................ 365/63 |
| 6,502,161 B1 * | 12/2002 | Perego et al. .................. 711/5 |
| 6,530,006 B1 * | 3/2003 | Dodd et al. ................. 711/167 |

* cited by examiner

*Primary Examiner*—Khanh Dang (57) ABSTRACT

The present invention is a high speed serial memory interface system and method that facilitates efficient communication of information between a system controller operating at a relatively high speed serial communication rate and a memory array operating at a relatively slow speed serial communication rate. In one embodiment the present invention is a high speed serial memory interface system with an information configuration core for coordinating proper alignment of information communication signals, a system interface for communicating with a system controller, and a memory array interface for communicating with a memory array. A memory module array for storing information and a high speed serial memory interface system for providing interface configuration management are integrated on a single substrate.

16 Claims, 9 Drawing Sheets

```
┌─────────────────────────────────────────┐
│ ENGAGING IN SERIAL COMMUNICATIONS AT A FIRST RATE │
│     WITH A SYSTEM MEMORY CONTROLLER.    │
│                   510                   │
└─────────────────────────────────────────┘
                     │
                     ▼
┌─────────────────────────────────────────┐
│   EXECUTING PARALLEL COMMUNICATIONS WITH A │
│      MEMORY ARRAY AT A SECOND RATE.     │
│                   520                   │
└─────────────────────────────────────────┘
                     │
                     ▼
┌─────────────────────────────────────────┐
│ CONFIGURING THE INFORMATION IN PROPER ALIGNMENT │
│   FOR COMMUNICATION BETWEEN SERIAL SYSTEM │
│ CONTROLLER SIGNALS AND PARALLEL MEMORY ARRAY │
│                 SIGNALS.                │
│                   530                   │
└─────────────────────────────────────────┘
```

HIGH SPEED MEMORY INTERFACE SYSTEM AND METHOD

BACKGROUND OF THE INVENTION

1. Field of the Invention

This invention relates to the field of electronic memory systems. In particular, the present invention relates to a system and method for providing high speed interface access to memory resources.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. The electronic systems that provide these advantageous results often rely upon information such as instructions or other data to perform their designated functions. The information is typically stored in an electronically readable medium referred to as a memory. The speed at which various electronic components interact with the memory (such as access information) typically has a significant impact on the performance and capabilities of a system. The integrity of the information delivery also has a significant impact on the performance of the system. However, traditional memory technologies often require expensive configurations and manipulations to provide relatively fast memory access with reliable delivery.

As applications and functionality of electronic systems advanced there is often a requirement for greater information storage capacity. One traditional approach to increasing memory capacity is to utilize peripheral memory mediums that are conducive to storing relatively large quantities of information such as hard drives or memory disks like digital video disks (DVD), CD, etc. While large capacity storage mediums usually provide large storage space, interfacing operations such as reading or writing the information are usually relatively slow. There are traditional system memory components that are faster than the peripheral large capacity storage devices, but the traditional system memory components are usually limited in capacity due to the exorbitant costs associated with producing a single large capacity system memory array. Therefore, in order to achieve requisite capacity without overwhelming expense a plurality of smaller traditional system memory arrays (such as memory chips) are provided. However, dividing the system memory up into a plurality of system memory arrays increases the demands on the system and expands adverse affects while slowing down the system memory access operations.

Traditional system memory architectures typically have several undesirable characteristics such as a relatively high pin count, noisy environment, high Federal Communication Commission (FCC) radiation, and large board area. Traditional interfaces between system controllers and memory arrays (such as a memory chip) typically consist of a plurality of memory chips spread out over a printed circuit board area. The system controller is connected by parallel bus lines to each system memory array within the overall system memory scheme. Each of the bus paths requires an input or output pin with an input/output buffer. Each of the bus paths also has capacative loading and generates detrimental flux that results in noise on a parallel bus path. The noise has the potential to corrupt the interpretation of the parallel signal and adversely impact the integrity and reliability of the information handling capabilities. Given that there are a large number of parallel toggling bus lines, noise becomes a significant problem in a traditional system memory architecture.

The system has to deal with coordinating interface operations between the system and the different memory arrays (e.g., memory chips). The coordinating memory interface operations strains system resources that would otherwise be available to perform other processing activities. The system in a traditional memory architecture has to ensure that the memory addressing configuration appropriately identifies memory locations of all the arrays in a cohesive manner. The system in a traditional memory architecture also has to coordinate signals on control lines to the different memory arrays to provide for cohesive overall memory control. The significant number of parallel bus paths to each memory array dramatically increases the complexity of the system controller memory coordination responsibilities.

Figure 1:
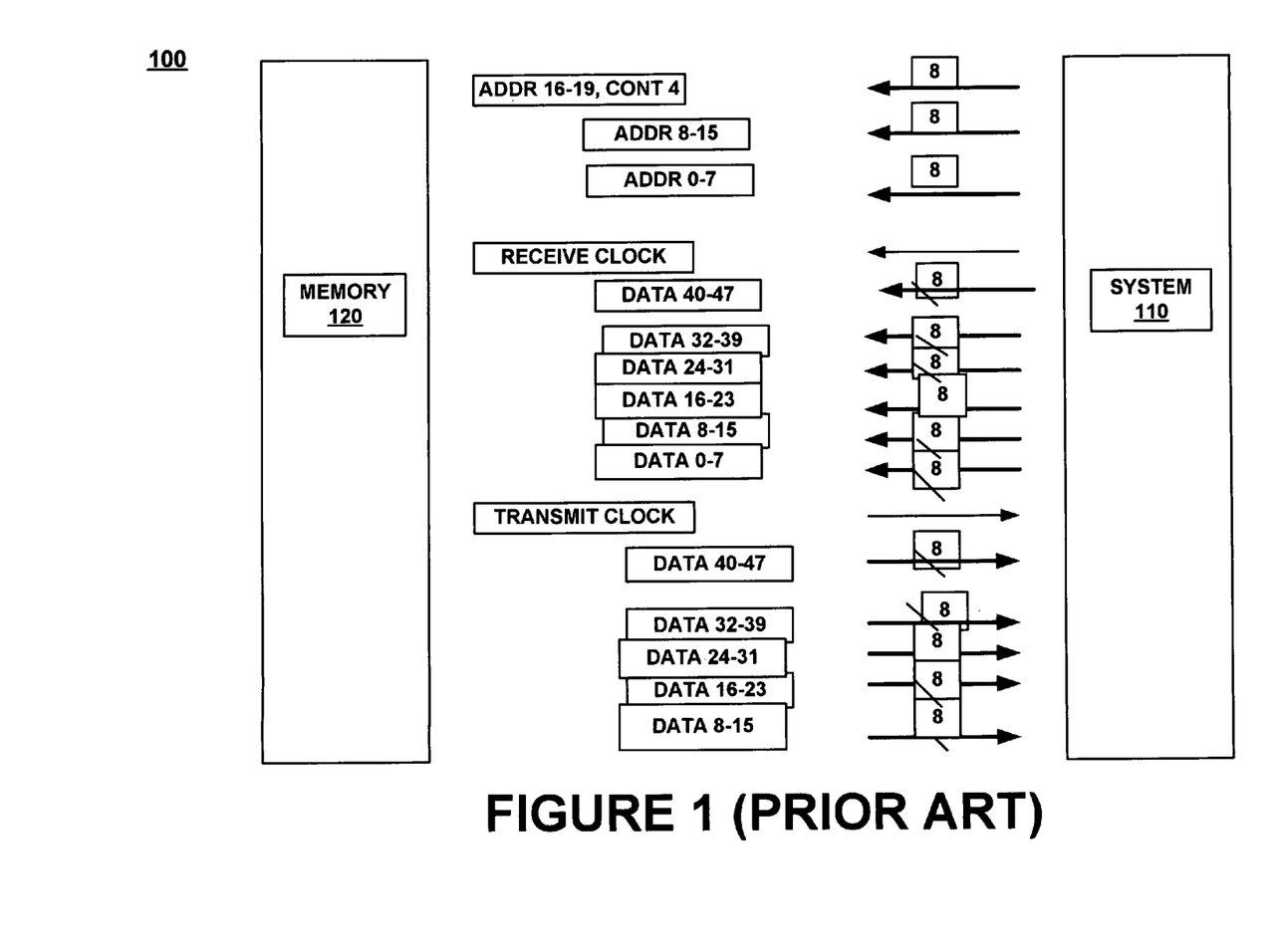
FIG. 1 is a block diagram of prior art system memory interface showing a typical way a traditional system interfaces with its traditional memory array.

FIG. 1 is a block diagram of prior art system memory interface 100 showing a typical way a traditional system interfaces with its traditional memory array. System memory interface 100 consisted of a system controller 110 and a memory chip 120. The system controller 110 is connected to memory chip 120 by a plurality of communication buses each running to a separate memory module (not shown) within memory chip 120. Each memory component within memory chip 120 has 16 data bit ports (read and write lines), 20 address bit ports and a byte (4 bit) enable control ports. For example, there are 8 data bus lines each for data bits 0–7, 8–15, 16–23, 24–31, 32–39 and 40–47 for both transmit (read) and receive (write) for a total of 96 data bus lines. In addition there are 20 address bus lines and control bits 0–3 for a total of 24 bus lines. The data and address bits are provided synchronously upon a clock edge. The receive clock is provided by the system clock and the transmit clock is the same clock after the buffering by the memory chip to meet the setup and hold time requirements at the interface.

What is required is a system and method that facilitates efficient communication of information between a system controller operating at a relatively high speed serial communication rate and a memory array operating at a relatively slow speed serial communication rate.

SUMMARY OF THE INVENTION

The present invention is a system and method that facilitates efficient communication of information between a system controller operating at a relatively high speed serial communication rate and a memory array operating at a relatively slow speed serial communication rate. In one embodiment the present invention is a high speed serial memory interface system with an information configuration core for coordinating proper alignment of information communication signals, a system interface for communicating with a system controller, and a memory array interface for communicating with a memory array. A memory module array for storing information and a high speed serial memory interface system for providing interface configuration management are integrated on a single substrate.

In one embodiment of the present invention, the memory module array is coupled to the high speed serial memory interface system by lines internal in the single substrate without drivers. The single substrate is a well controlled environment and capacitive flux in the point to point connections is manageable and does not adversely impact the integrity of the communications. The signals have low voltage swings that produce very low noise potential on each line resulting in very low noise in the system. In one exemplary implementation of the present invention data and address bits are provided synchronously upon a clock signal edge.

DETAILED DESCRIPTION OF THE INVENTION

Reference will now be made in detail to the preferred embodiments of the invention, a high speed serial memory interface system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Figure 2:
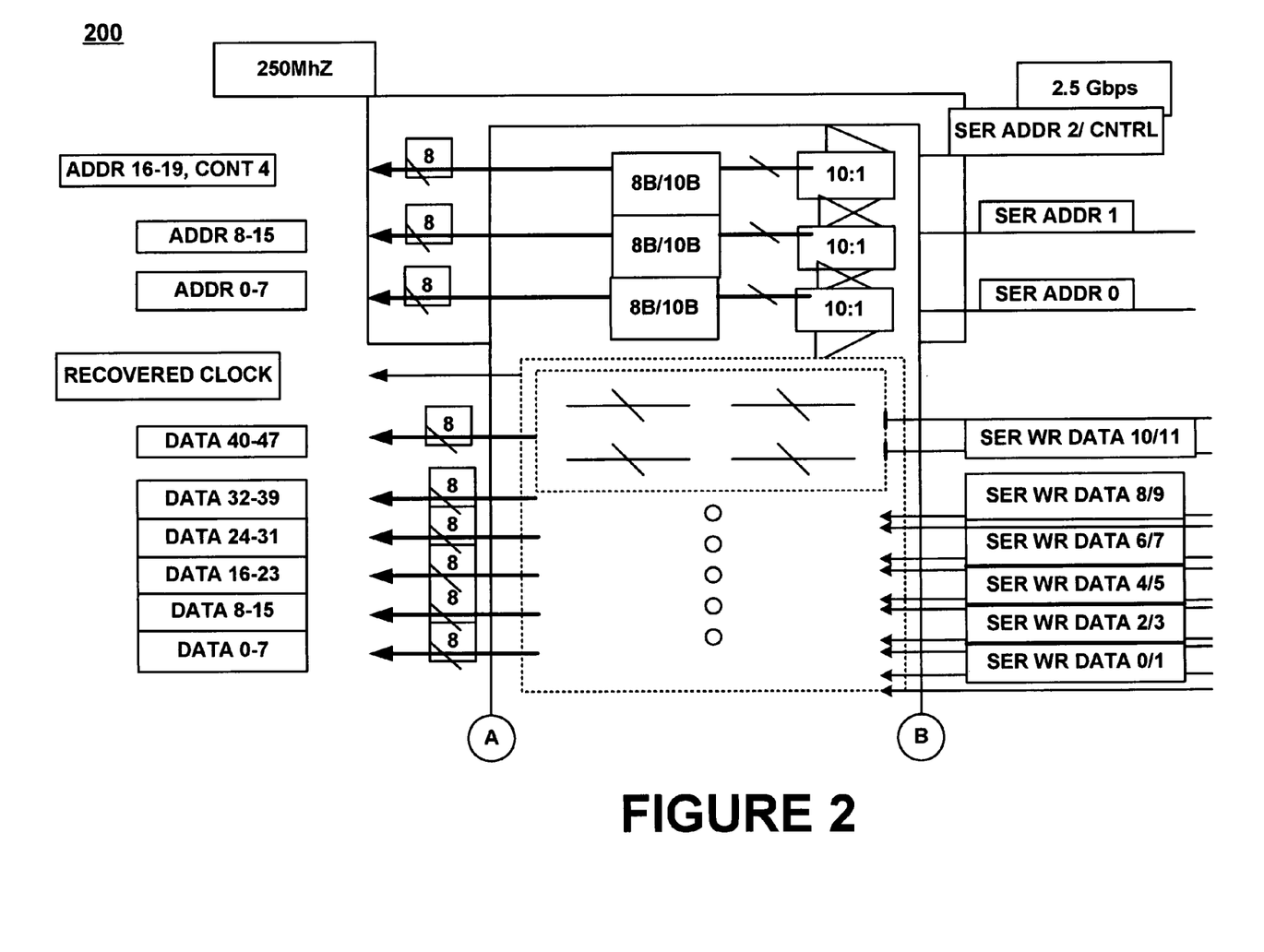
FIG. 2 is a illustration of a high speed serial memory interface system, one embodiment of the present invention.

FIG. 2 is a illustration of a high speed serial memory interface system 200, one embodiment of the present invention. High speed serial memory interface system 200 comprises an information configuration core for coordinating proper alignment of information communication signals, a system interface for communicating with a system controller (not shown) and a memory array interface for communicating with a memory array. In one embodiment of the present invention a system interface comprises 12 serial read data ports for communicating serial read information from a system controller, 12 serial write data ports for communicating serial write information from a system controller, and 3 serial address data ports for communicating serial address information from a system controller. In one embodiment of the present invention, a memory array interface comprises 48 parallel transmit ports for transmitting information to a memory array, 48 parallel receive ports for communicating for receiving information from a memory array, 20 parallel address ports for communicating address information to an address array and 4 control ports for communicating control information to an information array. In the illustrated embodiment there are 12 parallel transmits ports and receive ports each data bits 0–7, 8–15, 16–23, 24–31, 32–39 and 40–47 and there are 3 address ports for address bits 0–7, 8–15, 16–19 and control bits 0–3. The data ports are clocked at double data rate (500 MB/s), while the address and control lines are clocked at 250 MB/s.

The components of high speed serial memory interface system 200, cooperatively operate to facilitate efficient communication of information between speed serial system controller and sequential memory components configured to provide a large capacity memory array. The data and address bits are provided synchronously upon a clock edge. In the illustrated embodiment of high speed serial memory interface system 200 the memory array interface operates at 500 MB/s (clocked at both edges of the 250 MHZ clock) and the system interface operates at 2.5 GB/s. The low speed memory array interface deals with the reading and writing of data to and from the memory with the address and control buses. These communications are synchronous to 250 MHz system clock at double rated clocking (e.g., 500 MB/s). Thus, handling four bits of parallel data communicated at 500 mega bits per second (MB/s) enables the system interface to deal with the reading and writing of data to and from the system controller with the address and control bus communications at a serial rate of 2.5 giga bytes per second (GB/s). The actual serial rate is 2.5 GB/s because this embodiment of high speed serial memory interface system 200 includes 8B/10B encoding to remove the DC content of the signal in the media.

In the present exemplary implementation the four bits of parallel data at 500 MB/s translates to 8 bits of data at 250 MB/s. The 8b/10B translator adds two bits to the data. The serial port shifts this 10 bits of IO data at 250 MB/s. Thus the serial data rate is at 2.5 Gbps.

High speed serial memory interface system 200 provides a ten times speed improvement in the serial speed (over) the prior art. It provides the 10 fold increase by accessing the parallel data all at once by a serial input that is ten times the speed. High speed serial memory interface system 200 also has the capability that each one of the data ports can be updated together. For example if the bus from a 16 bit per channel (e.g., 16 bits of read write data per memory module) is utilized, then only four lines on the serial bus are required. The reduction of the transistor to transistor logic (TTL) signals is an advantage of the serial link. Not only is the chain count reduced by ten because of the ratio 10 to 1 ratio, it is also results in essential low voltage swings that produce very low noise potential on each line resulting in very low noise in the system. In addition the number of pins required on the system controller is drastically reduced.

Figure 7:
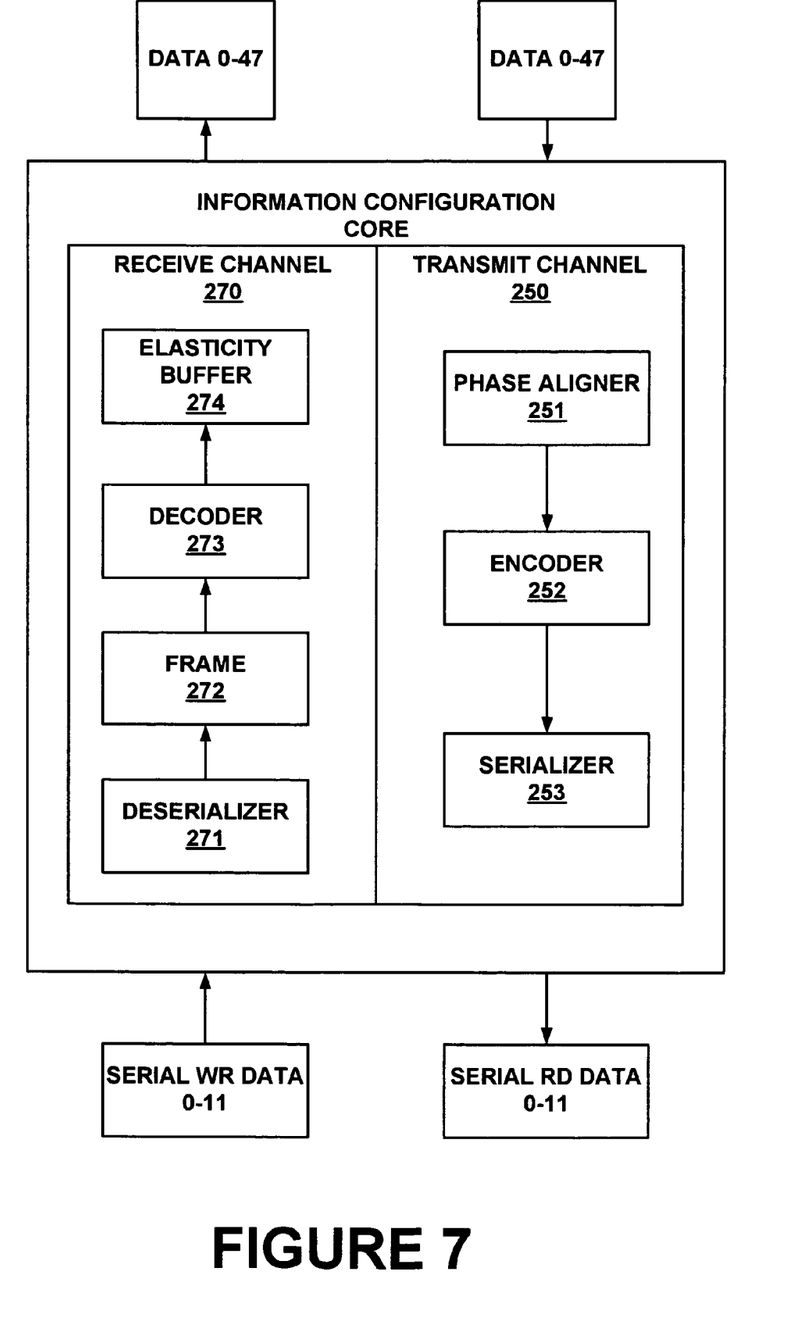
FIG. 7 is a block diagram of an information configuration core in accordance with one embodiment of the present invention.

In one embodiment of the present invention, the information configuration core includes a transmit channel comprising a phase aligner, encoder and serializer and each receive channel includes a deserializer, framer, decoder and an elasticity buffer. FIG. 7 is a block diagram of one exemplary implementation of an information configuration core including transmit channel 250 and receive channel 270. Transmit channel 250 includes phase aligner 251, encoder 252 and serializer 253. Receive channel 270 includes deserializer 271, framer 272, decoder 273 and elasticity buffer 274. The phase aligner for aligns signals forwarded from said memory array interface, the encoder encodes the signals and the serializer serializes signals received from the memory array interface. The deserializer deserializes information received from the system interface, the framer frames the information, a decoder decodes the information, and the elasticity buffer buffers the information received from said system interface.

Another advantage of this particular architecture is the ability to cascade or line up all the channels together. In one embodiment of the present invention the back side or memory array side has individual first in first out (FIFO) channels. Each individual channel at the receive parallel output forwards the signals through an elasticity buffer. The elasticity buffer facilitates correction of phase differences between channels if there is a phase skew (e.g., of the channel of up to one byte time). For example, data may be coming in one two different channels and become skewed in time due to the length of the serial cable. In one exemplary implementation, even though the information is configured as a parallel line up of the serial data information, when it is translated to the parallel side it may be skewed by plus or minus one byte. The elasticity buffer allows the data to be put in temporary storage while it is writing data with the serial cover clock. For example, the data is actually lined up while being read from the 250 MHz local clock side. In one embodiment of the present invention the synchronization symbol is a K28.5 signal that prevents data from being forwards until data is appropriately lined up in each parallel channel (e.g., four channels). In one embodiment, the present invention includes an elasticity buffer as described in "Circuitry, Architecture, and Method (s) for Synchronizing Data" (U.S. Pat. No. 6,594,325), incorporated herein by this reference.

Figure 3:
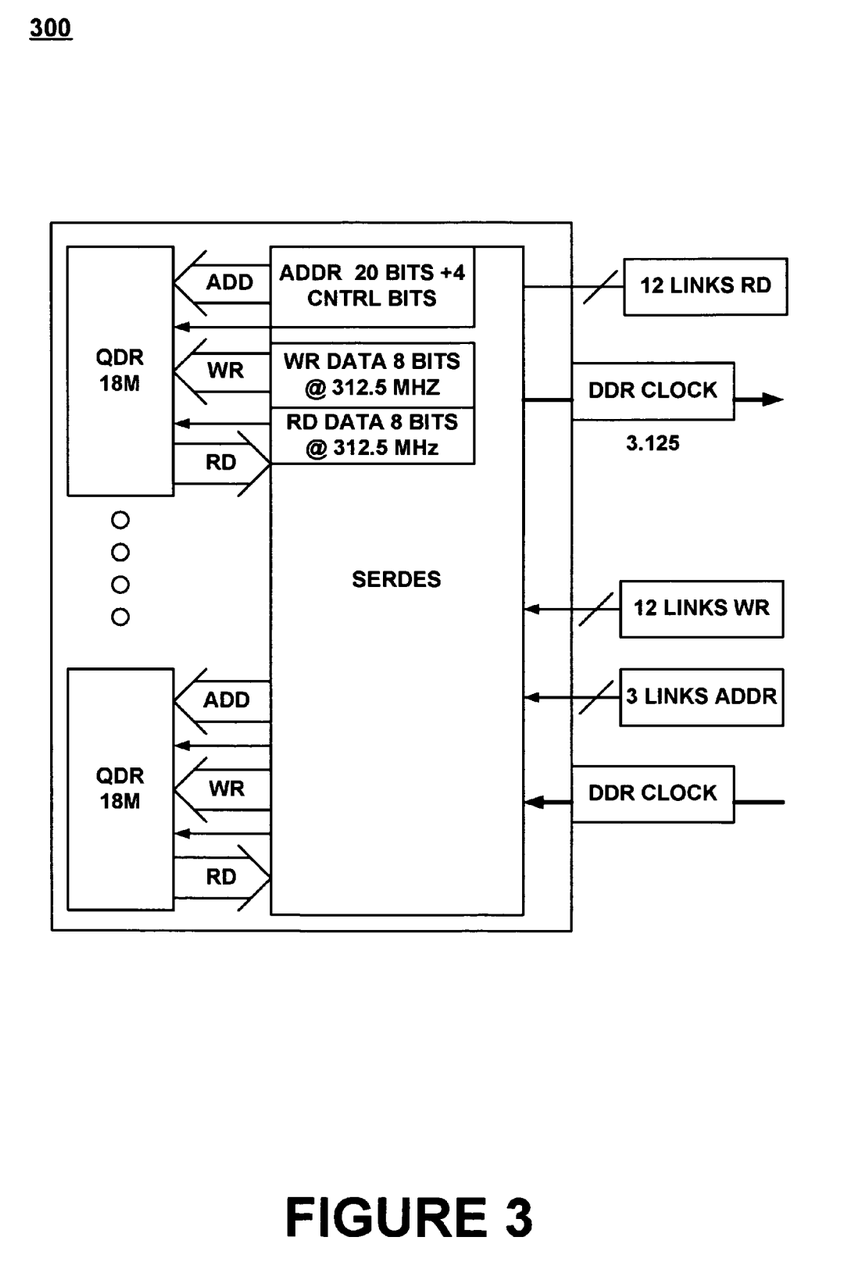
FIG. 3 is an illustration of another exemplary implementation of a present invention high speed serial memory interface system.

It is appreciated that the present invention is readily adaptable to a variety of configurations. FIG. 3 is an illustration of high speed serial memory interface system 300, one embodiment of the present invention. High speed serial memory interface system 300 is similar to high speed serial memory interface system 200 except the communication speeds at the memory array and system controller interfaces are different. High speed serial memory interface system 300 illustrates that the present invention provides options that enables increases in the bandwidth by increasing the speed. For example, system 200 had a serial communication speed of 2.5 GB/s and system 300 has increased the serial communications to 3.125 GB/s. Of course the memory arrays (e.g., QDAR) coupled to high speed serial memory interface system 300 would also have to be upgraded (e.g. to 312.5 MHz instead of 250 MHz). While the speed ratio of the system controller interface and the memory array interface of high speed serial memory interface system 200 and 300 remained the same (e.g., 10), the present invention is capable of being implemented to support other ratios. In the present implementations, the ratio is ten because of the instantaneous bandwidth that they can encode stays proportional. For example, with different kinds of encoding the proportion may change 6 bits of encoded data to 120 bit wide data or other ratios.

Figure 4:
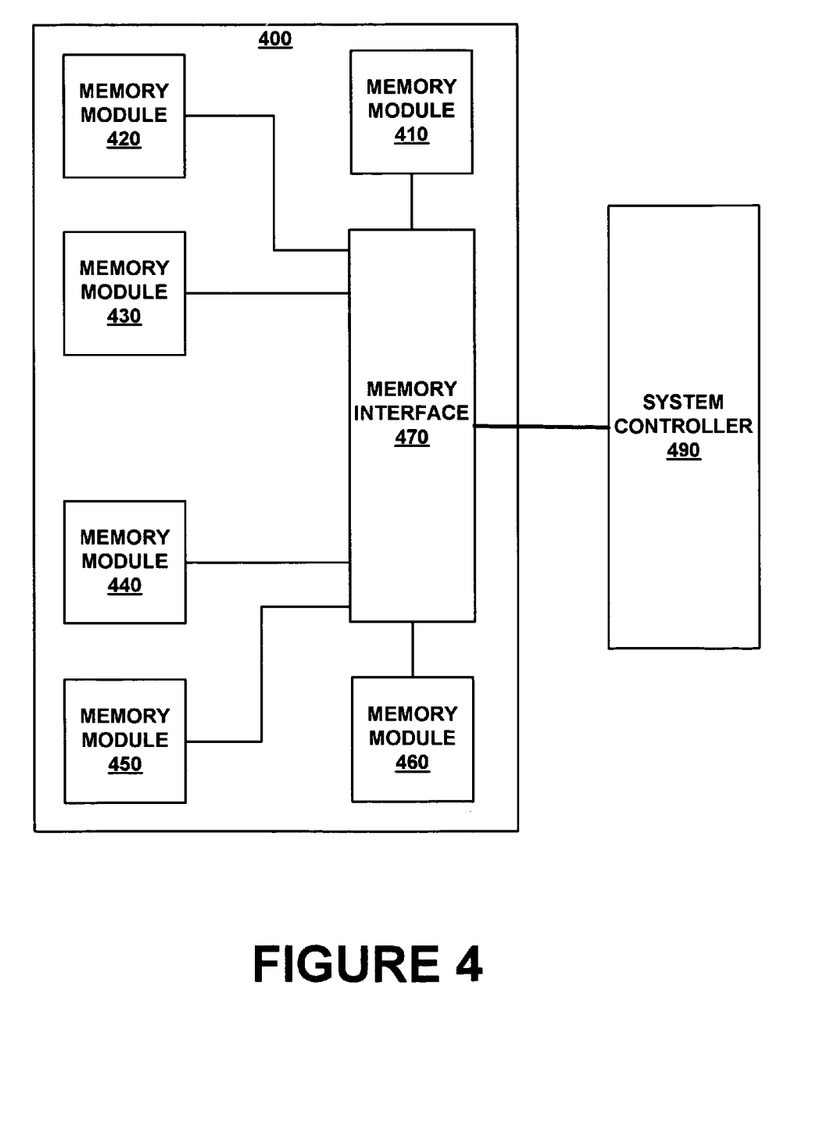
FIG. 4 is a block diagram of memory module integrated high speed serial interface system, illustrating an exemplary single substrate implementation of the present invention.

FIG. 4 is a block diagram of memory module integrated high speed serial interface system 400, on embodiment of the present invention. Memory module integrated high speed serial interface system 400 comprises memory module arrays 410, 420, 430, 440, 450, and 460, and high speed serial memory interface system 470. The memory module arrays are coupled to the high speed serial memory interface system 470. Memory arrays 410, 420, 430, 440, 450, and 460 store information. High speed serial memory interface system 470 provides interface configuration management of information communications between speed serial system controller and memory module arrays 410, 420, 430, 440, 450, and 460. This is an implementation of the present invention illustrating the integration of memory array components and a high speed serial memory interface system on a single substrate.

An important advantage of integrating the memory array and the high speed serial memory interface system components on a single substrate is this there are no drivers between the high speed serial memory interface system and the memory modules, just internal lines. The single substrate module is a well controlled environment and there is no board capacitance and no flux in the point to point connections a substrate. This significantly reduces noise to a point where it is very manageable and does not adversely impact the integrity of the communications. The only remaining drivers are at the input and output from the chip point of view. Replacing the memory arrays and a signal chip with a high speed serial memory interface system 470 also relieves the end user from potential significant coordination problems.

Figure 5:
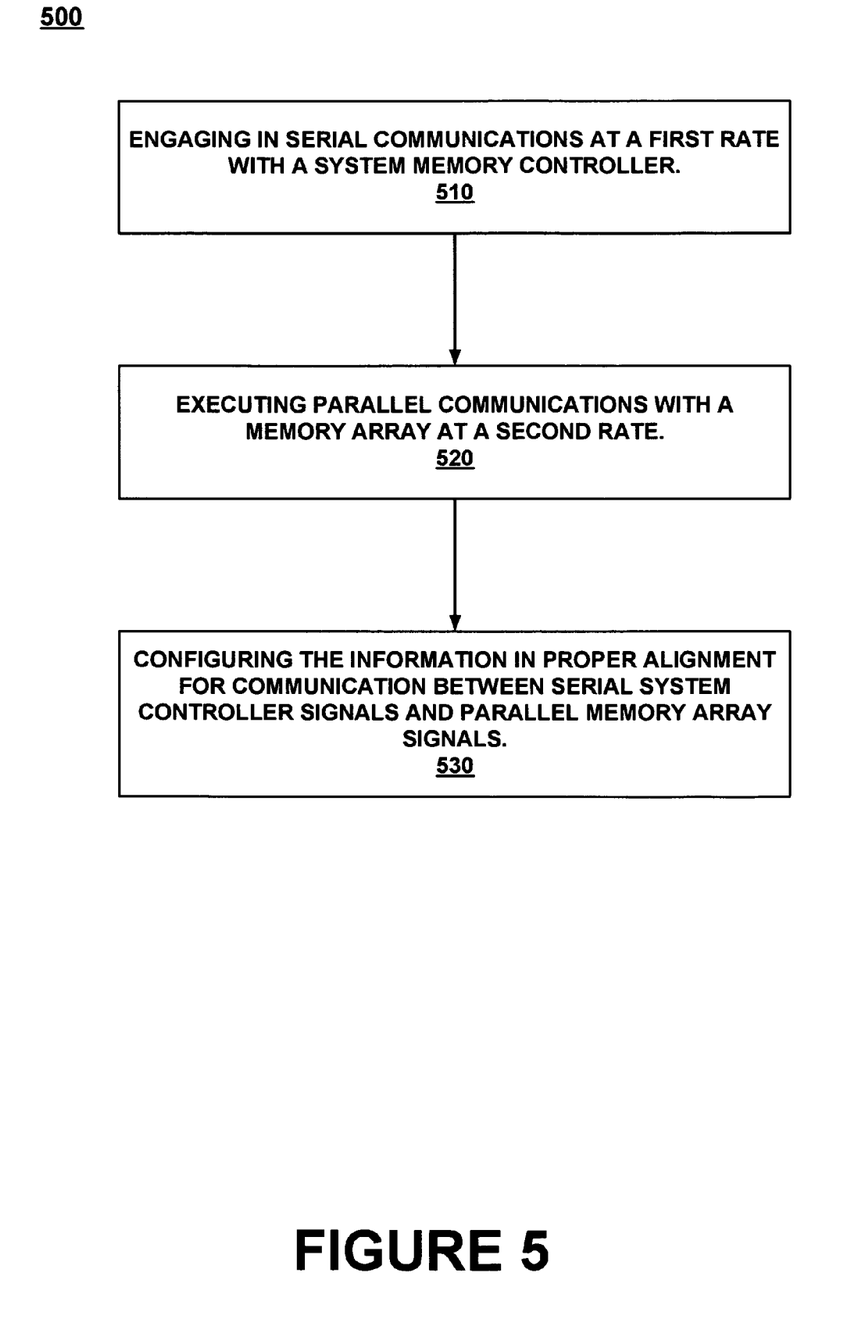
FIG. 5 is a flow chart of a high speed serial memory interface method, one embodiment of the present invention.

FIG. 5 is a flow chart of high speed serial memory interface method 500, one embodiment of the present invention. High speed serial memory interface method 500 facilitates efficient communication of information between high speed serial system controller and sequential memory components configured to provide a large capacity memory array.

In step 510 engage in serial communications with a system memory controller. In one embodiment of the present invention, information is communicated via a system interface for communicating with a system controller. In one exemplary implementation, system memory information write signals, address signals and control signals are serially received and system memory information read signals are serially transmitted at a relatively fast clock rate. The data and address bits are provided synchronously upon a clock signal edge. For example, there is a double data rate (DDR) clocking operation on the data ports as described above in which 4 units of parallel data at 500 MB/s translated to 8 bits of data at 250 MB/s. In one embdoiment in which an 8B/10B translator adds 2 bits to the data, a serial port shifts the 10 bits at 250 MB/s and the serial data rate is at 2.5 Gbps.

In step 520 execute parallel communications with a memory array. In one embodiment of the present invention, information is communicated via a memory array interface for communicating with a memory array. In one exemplary implementation, memory array information receive signals, address signals and control signals are transmitted in parallel and memory array information transmit signals are parallel received at a relatively slow clock rate. The data and address bits are provided synchronously upon a clock signal edge.

Figure 6A:
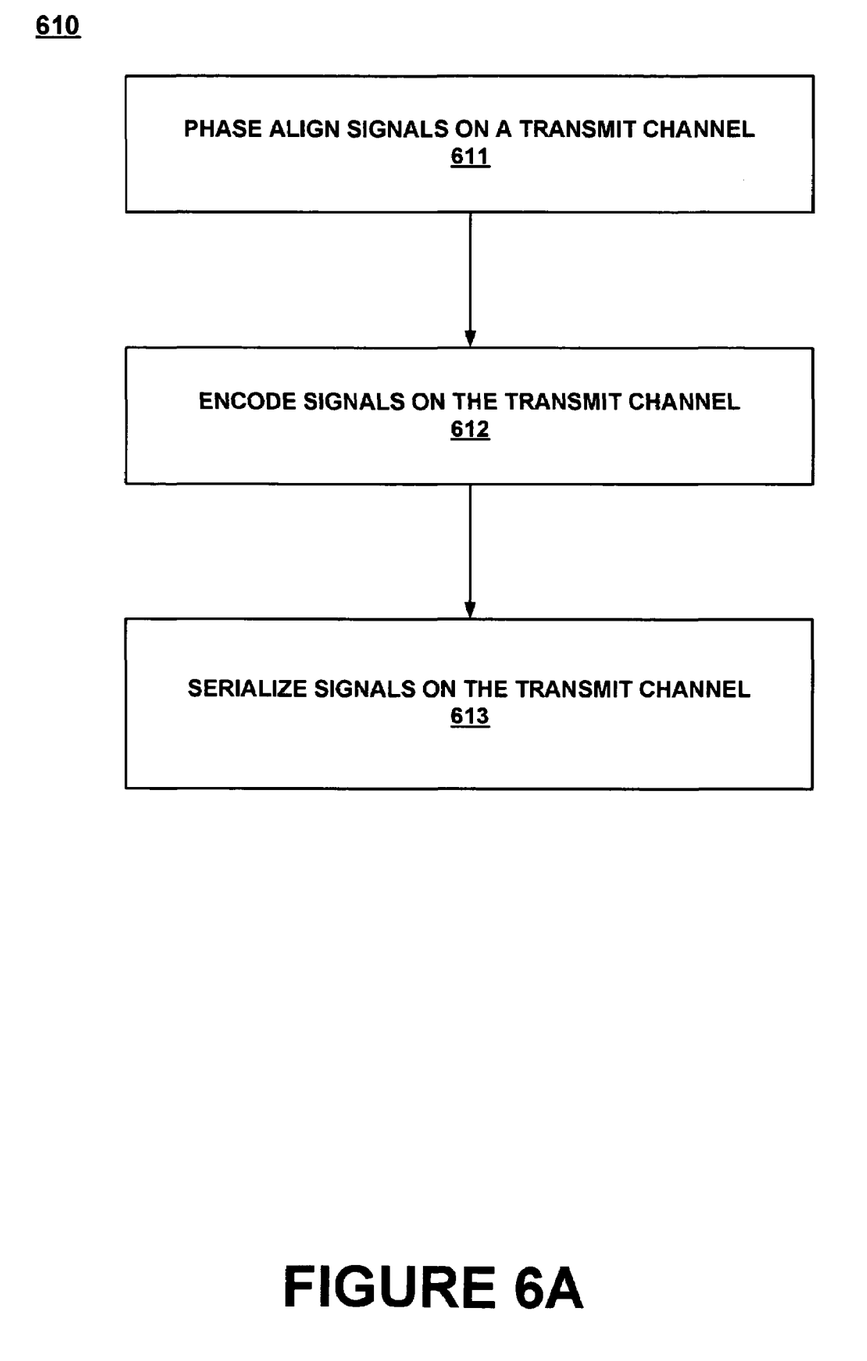
FIG. 6A is a flow chart of exemplary transmit channel in accordance with one embodiment of the present invention.
Figure 6B:
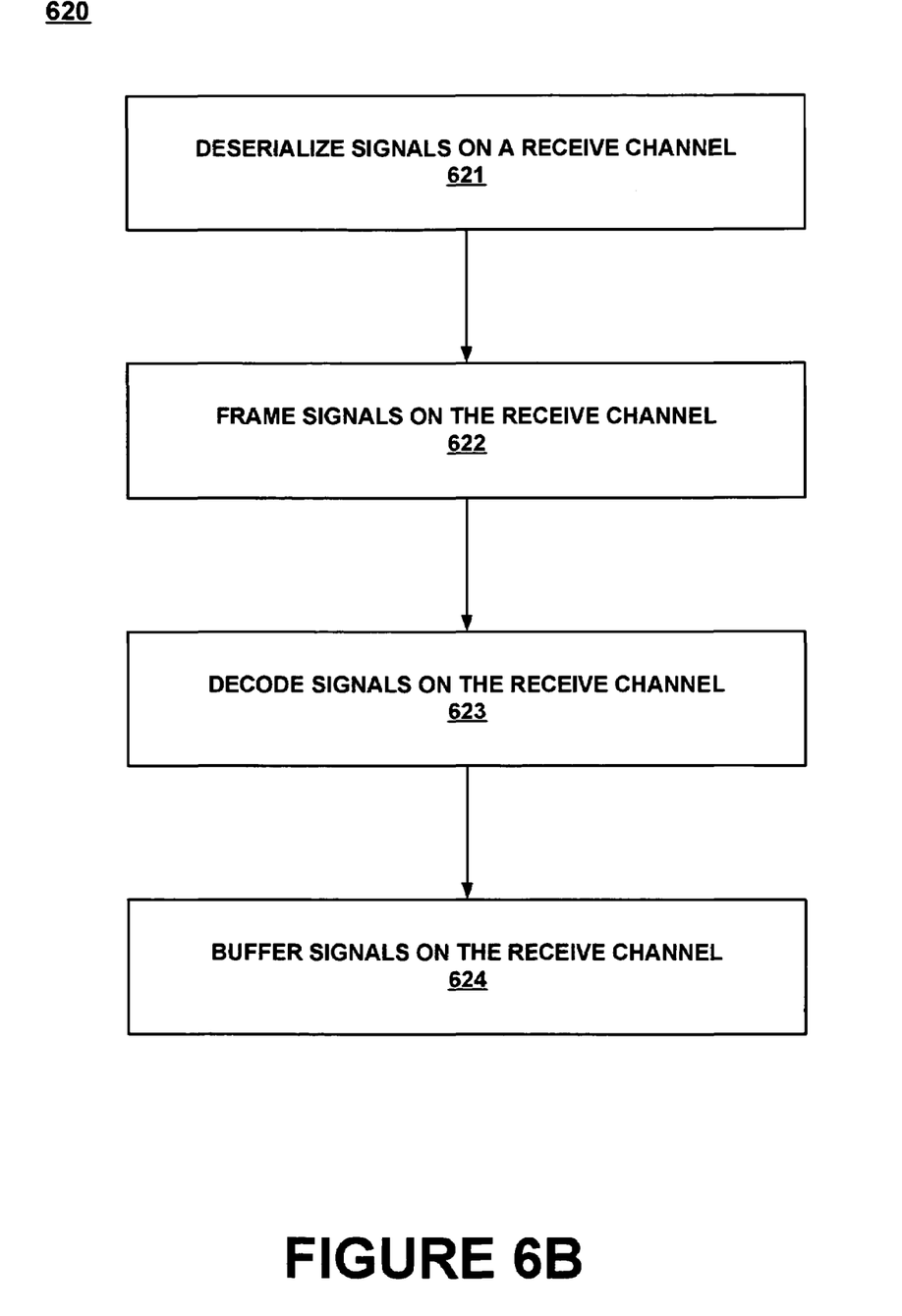
FIG. 6B is a flow chart of exemplary receive channel in accordance with one embodiment of the present invention.

In step 530 information is configured in proper alignment for communication between serial system controller signals and parallel memory array signals. Configuring information includes coordination for conveyance of serial signals at a first relatively fast rate to a system memory controller and conveyance of parallel signals at a second relatively slow rate to a memory array. In one embodiment of the present invention, information is communicated via an information configuration core. In one exemplary implementation of the present invention the signals on a transmit channel are phase aligned, encoded and serialized. FIG. 6A is a flow chart of exemplary transmit channel 610 in which signals are phase aligned in step 611, encoded in step 612, serialized in step 613. The signals on a receive channel are deserialized, framed, decoded and buffered (e.g. be an elasticity buffer). FIG. 6B is a flow chart of exemplary receive channel 620 in which signals are deserialized in step 621, framed in step 622, decoded in step 623 and buffered in step 624.

Thus, the present invention is a system and method that facilitates fast communication of information between a system controller and a memory array. The memory module array is coupled to the high speed serial memory interface system by lines internal in the single substrate without large drivers. The single substrate is a well controlled environment and capacitive loading in the point to point connections is manageable and does not adversely impact the integrity of the communications. The signals have low voltage swings that produce very low noise potential on each line resulting in very low noise in the system. In one exemplary implementation of the present invention data and address bits are provided synchronously upon a clock signal edge and the communications are synchronous to 250 MHz system clock at double rated clocking (e.g., 500 MB/s).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A high speed serial memory interface system comprising:
    an information configuration core for coordinating proper alignment of information communication signals, wherein said information configuration core includes a transmit channel with:
        a phase aligner for aligning signals forwarded from said memory array interface;
        an encoder for encoding said signals forwarded from said memory array interface, said encoder coupled to said phase aligner; and
        a serializer for serializing signals receive from said memory array interface, said serializer coupled to said encoder;
    a system interface for communicating with a system controller at a first communication rate, said system interface coupled to said information configuration core; and
    a memory array interface for communicating with a memory array at a second communication rate, said memory array interface coupled to said information core, wherein said memory array is included on a same substrate as said high speed serial memory interface system.

2. A high speed serial memory interface system of claim 1 wherein said memory array interface operates at a second clock speed that is slower than a first clock speed of operations at said system interface.

3. A high speed serial memory interface system of claim 1 wherein said memory array interface deals with the reading and writing of data to and from a memory array with the address and control buses.

4. A high speed serial memory interface system of claim 1 wherein said communications are synchronous to a system clock at double rated clocking.

5. A high speed serial memory interface system of claim 1 wherein said system interface includes a serial memory interface that operates at a first clock speed that is faster than a second clock speed of operations at said memory array interface.

6. A high speed serial memory interface system of claim 1 wherein said information configuration core includes 8B/10B encoding.

7. A high speed serial memory interface system of claim 1 wherein a memory module array is coupled by lines internal in a single substrate to said high speed serial memory interface system without drivers.

8. A high speed serial memory interface system of claim 1 wherein data and address bits are provided synchronously upon a clock signal edge.

9. A high speed serial memory interface system comprising:
    an information configuration core for coordinating proper alignment of information communication signals, wherein said information configuration core includes a receive channel with:
        a deserializer for deserializing information received from said system interface;
        a framer for framing information received from said system interface to its byte boundary, said framer coupled to said deserializer;
        a decoder for decoding information received from said system interface, said decoder coupled to said framer; and
        an elasticity buffer for buffering information received from said system interface, said elasticity buffer coupled to said decoder;
    a system interface for communicating with a system controller at a first communication rate, said system interface coupled to said information configuration core; and
    a memory array interface for communicating with a memory array at a second communication rate, said memory array interface coupled to said information core, wherein said memory array is included on a same substrate as said high speed serial memory interface system.

10. A high speed serial memory interface system of claim 9 wherein said memory array interface operates at a second clock speed that is slower than a first clock speed of operations at said system interface.

11. A high speed serial memory interface system of claim 9 wherein said memory array interface deals with the reading and writing of data to and from a memory array with the address and control buses.

12. A high speed serial memory interface system of claim 9 wherein said communications are synchronous to a system clock at double rated clocking.

13. A high speed serial memory interface system of claim 9 wherein said system interface includes a serial memory interface that operates at a first clock speed that is faster than a second clock speed of operations at said memory array interface.

14. A high speed serial memory interface system of claim 9 wherein said information configuration core includes 8B/10B encoding.

15. A high speed serial memory interface system of claim 9 wherein a memory module array is coupled by lines internal in a single substrate to said high speed serial memory interface system without drivers.

16. A high speed serial memory interface system of claim 9 wherein data and address bits are provided synchronously upon a clock signal edge.

* * * * *